United States Patent [19]

Cohen

[11] Patent Number: 5,383,457
[45] Date of Patent: * Jan. 24, 1995

[54] METHOD AND APPARATUS FOR PROCESSING IMAGES

[75] Inventor: Nathan Cohen, Belmont, Mass.

[73] Assignee: National Fertility Institute, San Francisco, Calif.

[ * ] Notice: The portion of the term of this patent subsequent to May 12, 2009 has been disclaimed.

[21] Appl. No.: 815,509

[22] Filed: Jan. 2, 1992

Related U.S. Application Data

[63] Continuation-in-part of Ser. No. 508,131, Apr. 16, 1990, which is a continuation-in-part of Ser. No. 341,047, Apr. 20, 1987, abandoned.

[51] Int. Cl.$^6$ .................... A61B 8/00; G01N 29/00
[52] U.S. Cl. ...................... 128/660.07; 364/413.25; 73/625
[58] Field of Search ............ 128/660.07, 660.01; 73/602, 625–626; 364/413.25; 342/179

[56] References Cited

U.S. PATENT DOCUMENTS

| | | |
|---|---|---|
| 4,397,006 | 8/1983 | Galbraith . |
| 4,442,715 | 4/1984 | Brisken et al. . |
| 4,470,305 | 9/1984 | O'Donnell . |
| 4,478,085 | 10/1984 | Sasaki . |
| 4,509,525 | 4/1985 | Seo . |
| 4,553,437 | 11/1985 | Luthra et al. . |
| 4,586,135 | 4/1986 | Matsumoto . |
| 4,604,697 | 8/1986 | Luthra et al. . |
| 4,664,122 | 5/1987 | Yano . |
| 4,677,981 | 7/1987 | Coursant . |
| 4,716,414 | 12/1987 | Luttrell et al. .......... 342/179 |
| 4,817,614 | 4/1989 | Hasler et al. . |
| 4,835,689 | 5/1989 | O'Donnell . |
| 5,111,823 | 5/1992 | Cohen ................. 128/660.07 |
| 5,188,113 | 2/1993 | Sato et al. ............ 128/661.09 |

OTHER PUBLICATIONS

R. Thompson, et al. *Interferometry and Synthesis in Radioastronomy*, J. Wiley, 1986.

O'Donnell, et al. "Phase Aberration Measurements in Medical Ultrasound: Human Studies", *Ultrasonic Imaging*, vol. 10, pp. 1–11 (1988).

O'Donnell, et al. "Aberration Correction without the Need for a Beacon Signal", *IEEE Ultrasonics Symposium*, pp. 833–837 (1988).

O'Donnell, et al. "Phase-Aberration Correction Using Signals from Point Reflectors and Diffuse Scatterers: Measurement", *IEEE Transactions on Ultrasonics, Ferroelectrics and Frequency Control*, vol. 35, No. 6, pp. 768–774 (1988).

Hayakawa "Multifrequency Echoscopy for Quantitative Acoustical Characterization of Living Tissues", *J. Acoustical Society of America*, vol. 69 (6) pp. 1838–1840 (1981).

Somer, et al. "Real–Time Improvement of both Lateral and Range Resolution by Optical Signal Processing", *Ultrasonics Symposium Proceedings*, pp. 1002–1005 (1977).

Cohen, "Phase Recovery and Calibration with Underwater Acoustic Arrays", *J. Acoustical Society of America*, Sup. 1, vol. 82, pp. 574–575 (1987).

*Primary Examiner*—Francis Jaworski
*Attorney, Agent, or Firm*—Flehr, Hohbach, Test, Albritton & Herbert

[57] ABSTRACT

A method and apparatus for reducing noise and enhancing the dynamic range of an image data set gather from an array (12) of transducers (T). The method includes the step of processing the image data set in a digital computer (17) by a noise reduction technique, such as deconvolving the noise component by means of a CLEAN or other algorithm. Thereafter the artifact image data introduced by the noise reduction technique is reduced by masking the processed image data set with the original image data set. This masking is done by multiplying each data value in the processed image data set by the corresponding data value in the original image data set. The method further includes scaling and normalizing the masked data and finally displaying the same on an image display device (42). Additionally, for imaging apparatus (10) not having a cross-correlator (16), phase aberration is reduced by performing a coordinate transformation step prior to noise reduction using a non-standard set of coordinate transformation algorithms.

36 Claims, 2 Drawing Sheets

FIG.–2D

METHOD AND APPARATUS FOR PROCESSING IMAGES

RELATED APPLICATION

This application is a continuation-in-part application based upon application Ser. No. 07/508,131, filed Apr. 16, 1990, entitled METHOD AND APPARATUS FOR GENERATING ECHOGRAPHIC IMAGES, which application was a continuation-in-part application of parent application Ser. No. 07/341,047, filed Apr. 20, 1989, entitled APPARATUS AND METHOD FOR GENERATING ECHOGRAPHIC IMAGES and now abandoned.

TECHNICAL FIELD

The present invention relates, generally, to image processing apparatus and methods of the type employed in echographic applications, such as ultrasonic imaging, sonar imaging, microwave imaging and radar imaging, as well as in passive imaging such as is employed in radio astronomy. More particularly, the present invention relates to apparatus and methods for real-time imaging of moving target objects and apparatus and methods which employ image enhancing processing techniques, such as deconvolution and near field or phase aberration correction.

BACKGROUND OF THE INVENTION

Various linear and non-linear image processing techniques have been extensively employed in radio astronomy, radar, microwave and sonar applications to enhance the signal to noise ratio (dynamic range) and clarity (resolution) of images. Such systems typically have employed a plurality of transducers and/or receivers to create a synthetic aperture having many advantages over a single or filled aperture, but synthetic aperture systems also inherently including significant noise components.

In radio astronomy applications, or interferometry, quite sophisticated non-linear signal processing techniques have been employed to reduce noise and enhance clarity. Among these techniques is deconvolution of the noise component of image data from the valid signal component, and subsequent convolution of the signal components into a synthetic aperture image having greatly reduced noise and sharper resolution. Since radio astronomy is not concerned with real-time observations, quite elegant, although computer-burdensome, signal processing techniques can be employed to produce significant image enhancement. R. Thompson, et al. *Interferometry and Synthesis in Radioastronomy*, J. Wiley, 1986.

In applications which will benefit from a substantially real-time display of images, particularly of moving targets, the computing burden of conventional radio astronomy signal processing techniques is too great. In my above-identified co-pending application, I have recently adapted and employed certain interferometry signal processing techniques to ultrasonic echographic imaging. These imaging processing techniques, as employed in biomedical ultrasonic imaging, are more fully described in my prior applications identified above, which are incorporated herein by reference.

Noise deconvolution involves taking an original image data set from an array of transducers or receivers, deconvolving or mathematically separating the noise component side lobe data from the true image data using non-linear algorithms. The original or noise-containing data is sometimes referred to as a "dirty" image data set. It is known, for example, that side-by-side transducers or receivers will receive image data from a point source which would produce an image map having side lobes or noise produced by incompleteness of the synthesized aperture. For any array of a plurality of receivers or transducers, therefore, there will be a characteristic beam pattern (power pattern) or "point spread function" for the array. The beam pattern or point spread function is the image which would be sensed by the array if a single point were the only target in the image field; it does not, however, resemble a single point. Since there are a plurality of side-by-side transducers or receivers in the array making up the synthetic aperture, many of the receivers in the array may "see" the point source to some degree and as a result, the image will not be a point, but a spreading and distortion of the point including side lobes. As the image being processed becomes more complex, with multiple valid targets, the effects of side lobe noise become more pervasive and complex, and removal of these noise effects from the image data for the synthesized aperture becomes more important.

The elimination of noise using deconvolution may proceed by selecting the brightest or highest intensity data point on the "dirty map" of the image and then deconvolving this noise from the valid image data by using an algorithm based upon the point spread function or the characteristic beam pattern. Thus, one assumes that for the given brightest point, the side lobes, or noise, inherent to a multiple transducer array, should be removed. All of the data points, other than the brightest point, which would contain noise or side lobe effects from the brightest point, have their respective intensities reduced by an amount determined by the beam pattern or point spread function. The removal of the beam pattern, therefore, has the effect of removing the side lobes from data throughout the map.

Once noise around the brightest data point has been removed, the deconvolution process then proceeds to the next brightest data point in the dirty map, assumes that this next brightest data point is a valid data point and then removes the corresponding beam pattern for such data point from the remainder of the map. This process continues until the intensity of the brightest data point from which the noise is deconvolved reaches a predetermined level, for example, ten percent, of the intensity of the brightest data point in the entire map.

The beam pattern or point spread function is a three-dimensional pattern with the amplitude being the data intensity or the height dimension. The deconvolution process in which the side lobes are removed, therefore, ideally and in radio astronomy is a three-dimensional process.

Radio astronomy, however, has the luxury of not needing to process the signals on a real-time basis since the objects essentially are stationary from the point of view of the receivers. Additionally, substantial computing power can be dedicated to the signal processing task. As used herein, the expression "real-time" shall be understood to mean imaging at a rate of at least about 15 images (complete data maps) per second and preferably between about 30 to about 60 images per second. In some application real-time is considered to be as low as 5 images per second but this would be acceptable only for relatively slow moving targets.

The result in radio astronomy has been that relatively elegant and more accurate algorithms can be employed to accurately subtract the point spread function or beam pattern by deconvolution of the noise from the signal. Thus, three-dimensional CLEAN algorithms can be used, as can three-dimensional hybrid mapping and maximum entropy algorithms. Maximum entropy is generally regarded as being the most accurate algorithm, but is also has the greatest computational burden.

Typically, in ultrasound imaging, images are displayed on a video display terminal in which there are up to 512 lines with 512 pixels per line. A data map will, therefore, include up to 262,144 pixels or data points. In real-time imaging each map is presented 15 to 60 times per second. As will be appreciated, any deconvolution system which scans all the data points prior to making a selection as to the brightest point, will be faced with a computational burden which is substantial and which will make real-time imaging with an apparatus of reasonable cost very difficult.

It is also known, however, that deconvolution processes inherently introduce data into the processed image data set which is not valid or does not actually represent the object being imaged. These processing induced data are known as image processing "artifacts," and while they are far fewer than the noise data which has been eliminated by deconvolution, they degrade the image and particularly image resolution and produce inaccuracies which may compromise interpretation of the image.

As the deconvolution algorithms get more sophisticated and complex, the number and effects of processing artifacts are reduced, but the computational burden and time required are increased. As assumptions, simplifications and less sophisticated algorithms are employed, real-time processing becomes more realistic, but image degradation from processing artifacts becomes more significant.

Radio astronomy imaging routinely employs cross-correlation of data to produce useful data sets prior to deconvolution. While ultrasonic imaging literature suggests application of cross-correlation to ultrasonic imaging, commercially available ultrasonic imaging apparatus has no provision for data cross-correlation. This is particularly important in that one of the significant sources of image noise is the inhomogeneous medium through which image signals pass. In radio astronomy the medium is miles and miles of atmosphere and the distortions or noise produced by the same is called the "near field effect." In ultrasonic imaging the inhomogeneous medium is human tissue, and the distortion or noise produced is referred to in the industry as "phase aberration."

In radio astronomy imaging the near field effect is completely removed by employing closure phases obtained from the cross-correlation data prior to deconvolution of the noise. In ultrasonic imaging various alternative approximations have been employed to try to minimize or reduce near phase aberration. See, e.g., U.S. Pat. Nos. 4,817,614 to Hasler et al. and 4,835,689 to O'Donnell which employ adaptive reduction of phase aberrations. See also, e.g., companion technical articles, O'Donnell et al. "Phase Aberration Measurements in Medical Ultrasound: Human Studies" *Ultrasonic Imaging*, Vol. 10, pp. 1–11 (1988); O'Donnell et al. "Aberration Correction without the Need for a Beacon Signal", *IEEE Ultrasonics Symposium*, pp. 833–837 (1988); O'Donnell et al., "Phase-Aberration Correction Using Signals from Point Reflectors and Diffuse Scatterers: Measurement" *IEEE Transactions on Ultrasonics, Ferroelectrics and Frequency Control*, Vol. 35, No. 6, pp. 768–774 (1988). See, also, Hayakawa "Multifrequency Echoscopy for Quantitative Acoustical Characterization of Living Tissues" *J. Acoustical Society of America*, Vol. 69 (6), pp. 1838–1840 (1981) where an approximation of the attenuation coefficient in human tissue is developed.

In an article by Somer et al., "Real-Time Improvement of both Lateral and Range Resolution by Optical Signal Processing" *Ultrasonics Symposium Proceedings*, pp. 1002–1005 (1977) an ultrasonic image enhancing process is described in which lateral and axial resolution is improved by using coherent optical filtering. This is an optical approach to achieve an approximate phase aberration correction.

In U.S. Pat. Nos. 4,604,697 and 4,553,437, both to Luthra et al., a hybrid image is produced from the vector addition of amplitude and phase data from an array of transducers at a plurality of frequencies. The overall image is produced by adding partial images. In U.S. Pat. No. 4,586,135 to Matsumoto side lobe reduction is employed utilizing phase data to provide a holographic data set for reconstruction by a synthetic aperture technique.

Auto and cross-correlation also have been suggested in U.S. Pat. No. 4,397,006 to Galbraith to determine digital time domain filter parameters for noise reduction in seismographic teachings.

I have pointed out in my earlier copending application that by using cross-correlation in ultrasonic imaging and combining the same with specific image processing techniques phase aberration can be completely eliminated. Since present commercially available ultrasonic equipment does not include a cross-correlation capability, however, this approach is not currently easily implemented as an ultrasonic image enhancing process, particularly when retro-fitting existing ultrasonic equipment.

Thus, as phase aberration approximations are employed in ultrasonic imaging, the number of processing artifacts is increased.

Still other attempts have been made to enhance the clarity or resolution of ultrasonic images, but only limited success has been achieved. In U.S. Pat. No. 4,478,085 to Sasaki, the thickness of the ultrasonic transducers was varied over the array to try to minimize beam expansion. U.S. Pat. No. 4,470,305 to O'Donnell employs an annular array of ultrasonic transducers and time delayed pulses to simulate a horn transducer having a sharp focus in the near field. Using this system improved focusing can be achieved up to 20 centimeters, but imaging is accomplished at 3 MHz. The improvement in focus at depth is accomplished in the O'Donnell patent by using variable received signal gains to try to reduce the side lobe noise in the images.

In U.S. Pat. No. 4,677,981 to Coursant, improvement in the ultrasonic echographic image focusing is attempted by using polarization characteristics of the ultrasonic transducers. The disadvantage of this approach is the absence of the initial polarization information and a lack of total intensity. This approach adds little to significantly improve dynamic range and resolution of the ultrasonic images.

Variable frequency ultrasonic scanning also has been used, e.g., U.S. Pat. No. 4,442,715 to Brisken et al., and pitch variation is employed in the device of U.S. Pat.

No. 4,664,122 to Yano. Doppler shift also has been employed to detect motion of scanned targets, for example, as is taught in U.S. Pat. No. 4,509,525 to Seo.

In a published abstract of a paper that was not given or published, Dr. Nathan Cohen suggested that in underwater acoustic imaging linear and nonlinear imaging techniques could be used to aid in recovery of phase observables for increased dynamic range and image accuracy. The abstract also suggested that techniques from imaging disciplines such as optics and radio astronomy might be applied. Cohen, "Phase Recovery and Calibration with Underwater Acoustic Arrays", *J. Acoustical Society of America*, Sup. 1, Vol. 82, pp. 574–575 (1987). The techniques which might be applicable, how they might be applied and their suitability for medical imaging is not set forth in the abstract.

While radio astronomy images are displayed in Cartesian coordinates as X.Y images, ultrasonic images are more conventionally displayed in polar coordinates. Thus, a sector-like ultrasonic image is displayed in which the apex of the image is located at the transducer array. The data are displayed in a range or radius, r, and an azimuth or angle, $\theta$, format.

When an $r,\theta$ display format is used, the noise and side lobes at increasing range from the transducer will appear larger in extent. The image at increasing ranges appears much noisier than at ranges close to the transducer. In order to deconvolve the beam noise for an $r,\theta$ format display, a coordinate transformation of the $r,\theta$ data to X,Y coordinates for deconvolution in the X,Y format usually is performed. It also would be possible to convert the X,Y point spread function into $r,\theta$ format and then deconvolve the noise and in an $r,\theta$ format for conventional display.

The process and apparatus set forth in my prior copending application does not eliminate noise in the form of signal processing artifacts, nor is phase aberration reduced for signal processing equipment which does not include a cross-correlator. Both these goals are highly desirable, particularly if they can be accomplished at real-time rates with apparatus which can be retrofit to existing equipment at only modest cost.

Accordingly, it is an object of the present invention to provide an image processing method and apparatus which is capable of substantially reducing and even eliminating image processing artifacts produced by nonlinear and linear image processing techniques.

It is a further object of the present invention to provide an image processing method and apparatus which is capable of producing images having enhanced dynamic range and only a modest increase in computational burden.

It is another object of the present invention to provide an echography apparatus and method which will generate high-resolution images, at real-time imaging rates, of stationary and moving target objects in an inhomogeneous medium using ultrasonic signals.

Still a further object of the present invention is to provide an ultrasonic imaging apparatus and method which can retrofit to and is usable with existing ultrasonic transducer arrays and correlators to enhance the resolution and dynamic range of the images produced.

Still another object of the present invention is to provide an image processing apparatus and method in which phase aberration can be reduced.

Another object of the present invention is to provide an echographic image processing apparatus and method which is capable of real-time image processing with reduced phase aberration and reduced processing-induced noise, and which has modest cost and can be easily retrofit for use with a variety of echographic imaging apparatus.

Still another object of the present invention is to provide an image processing apparatus and method which can be easily adjusted by medical personnel to empirically reduce phase aberration.

The apparatus and method of the present invention have other features of advantage and objects which will become apparent from, and are set forth in more detail in the following Best Mode of Carrying Out the Invention and the accompanying drawing.

DISCLOSURE OF INVENTION

In one aspect of the present invention a method and apparatus for enhancing processed image data to remove processing artifacts is provided. The method comprises, briefly, the steps of comparing data from a processed image data set with corresponding data from an original or relatively unprocessed image data set, and revaluing data in the processed image data set in proportion to the value of corresponding data in the original image data set. The apparatus includes, briefly, "masking" apparatus connected to reduce the value of data in processed image data set by an amount determined by the data in an original image data set.

In another aspect of the present invention, a method and apparatus for reducing phase aberration is provided. The method is comprised, briefly, of the steps of performing a non-standard coordinate transformation on one of data from an image data set and a deconvolution algorithm used to deconvolve noise from image data. The non-standard coordinate transformation can be empirically adjusted by a clinician to reduce phase aberration without the use of cross-correlation apparatus. Phase aberration apparatus including a coordinate transformation input device coupled to vary coordinate transformation from conventional algorithms is provided.

BEST MODE OF CARRYING OUT THE INVENTION

The apparatus and process of the present invention for removing signal processing artifacts is described in detail in connection with a side lobe subtraction process using a CLEAN algorithm, but it will be understood that the present invention has application to a wide range of signal processing techniques which are capable of generating data artifacts. Thus, the system of the present invention is applicable to hybrid mapping techniques, maximum entropy noise reduction techniques, and even linear signal averaging processes. Similarly, the system of the present invention is described in detail in connection with ultrasonic signal processing, but it is applicable to active image processing systems employed in radar, microwave, sonar and optical signal processing, as well as being applicable to passive signal processing of the type used, for example, in radio astronomy.

Figure 1:
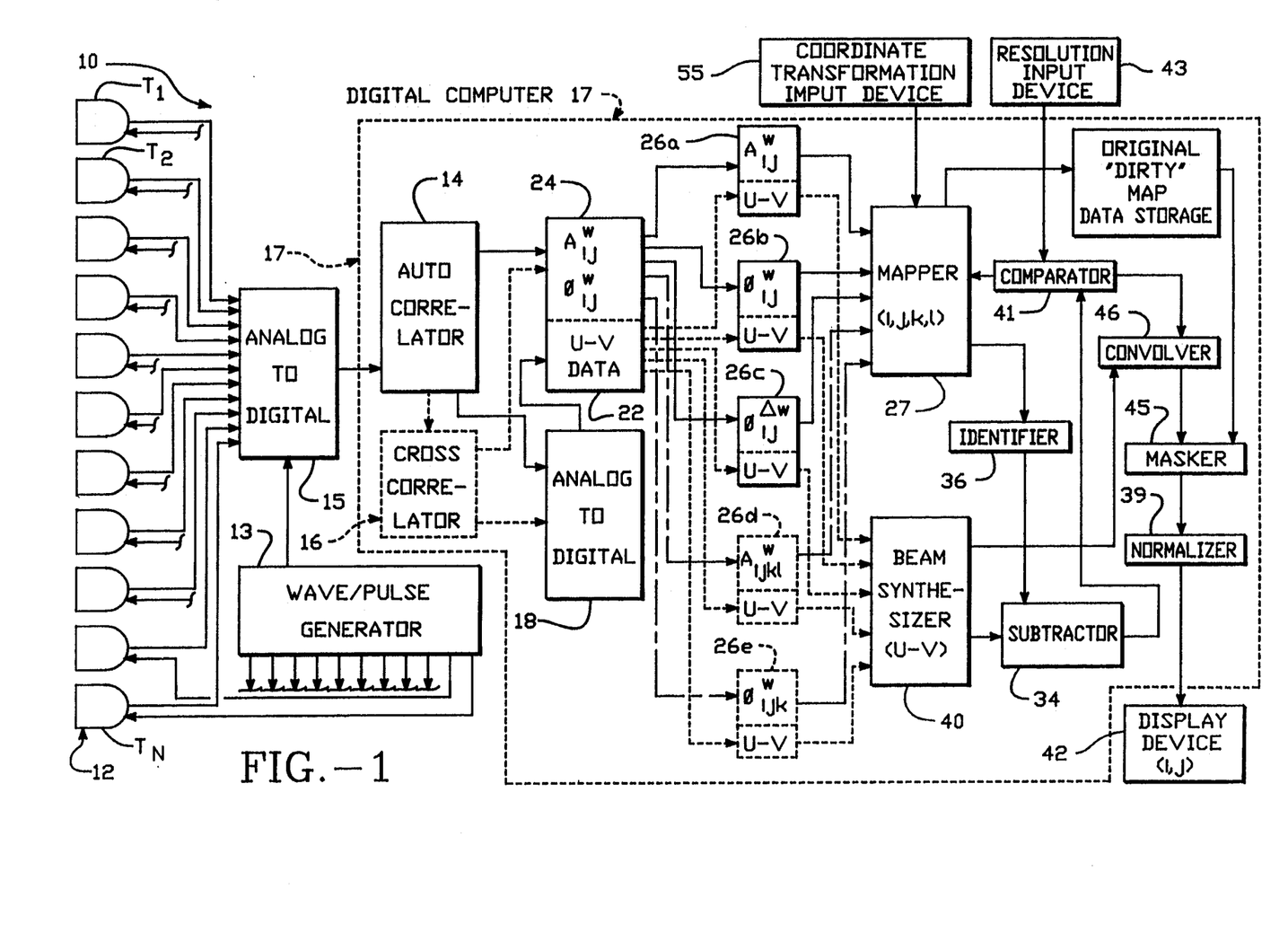
FIG. 1 is a schematic representation of echographic image processing apparatus constructed in accordance with the present invention.

As shown schematically in FIG. 1 an ultrasonic echography imaging apparatus, generally designated 10, can be seen to include a transmitting and receiving transducer array, generally designated 12, which includes transducers $T_1$ through $T_N$. Transducers T are geometrically positioned to transmit a signal in the direction of a target object (not shown), such as human tissue. In radar, microwave and other applications the target object can vary substantially, and the nature of the target object does not form a portion of the present invention. The greater the number of transducers, the larger the geometric aperture of the image which can be obtained from array 12. Transducers T need not be positioned in a linear array as shown in FIG. 1, and more conventionally the transducers will be mounted in a two-dimensional array on a common frame or probe at predetermined fixed relative locations.

In ultrasonic applications it is preferable that transducers $T_1$ through $T_N$ each transmit a broad band pulse or Doppler-shifted continuous wave signals. Thus, wave/pulse generator 13 is electrically coupled to each of transducers T to drive the same and further is coupled to an analog-to-digital converter 15 for input to a general purpose digital computer 17 (schematically shown in FIG. 1 by a broken boundary line).

The transmitted ultrasonic signals from each transducer propagate through the transmission medium until they contact and bounce off of selected target tissue. The reflected pulse/wave returns toward its transducer source as an echo signal and is received by the transducer. Echo signals, however, also will be received by adjacent transducers but differences in the distance, properties and noise characteristics of each transducer and dispersion differences produced by layers of intervening inhomogeneous medium will contribute to phase and amplitude differences of the echo signal as received by adjacent transducers. Individual transducers $T_1$-$T_N$ will, therefore, receive the reflected echo signals over a range of time delays corresponding to the position, distance, contoured structure of the target and reflectivity of the medium. The phase and amplitude of the echo signal received by each transducer are measured at each moment of time and input to computer 17 through analog-to-digital converter 15.

Autocorrelator, diagrammatically indicated by box 14, is adapted to autocorrelate the transmitted and received signals for each transducer over the propagation time delay. The autocorrelator executes a well-known autocorrelation algorithm to perform an autocorrelation between transmitted and received signals for each transducer. Ideally and in applications other than commercial ultrasonic echography, autocorrelator 14 is coupled to a cross-correlator 16, shown in broken lines. Cross-correlator 16 is adapted to cross-correlate pairs of autocorrelated signals. The purpose of cross-correlation is to determine the amplitude and phase density distributions of the entire geometric aperture defined by transducer bank 12. Cross-correlation determines the phase offsets due to the relative physical position differences between the cross-correlated pairs of transducers relative to the target. These differences are fixed as a result of the configuration of the transducer bank.

Commercial ultrasonic imaging equipment, however, does not currently include cross-correlation apparatus 16, even though the use of such cross-correlation apparatus would eliminate phase aberration due to medium inhomogeneity. The artifact removal apparatus and process of the present invention, however, is applicable to image processing apparatus which includes cross-correlation, as well as to apparatus which does not, such as conventional ultrasonic imaging equipment.

The amplitude and frequency data from autocorrelator 14 then can be directly stored as time domain data in data storage matrix 24 in the form of "visibility amplitude" data, $A_{ij}^\omega$. Additionally, the "visibility phase" data is similarly stored directly in matrix 24 as time domain visibility phase data, $\phi_{ij}^\omega$.

These data alone often are used for image mapping, with the visibility phase data typically being discarded as containing too much noise. My previous application described how additional useful data from ultrasonic imaging transducers can be obtained, partitioned and used for mapping, and such description is incorporated herein by reference. The apparatus and process of the present invention for reducing data processing artifacts can be employed with various combinations of partitioned data as set forth in my prior application. It is not required, however, that my previous process for recovering additional useful data be employed in order to practice the present invention for reducing data processing artifacts.

Briefly, however, additional data useful in image mapping can be obtained by a Fourier-like transformation at Fourier transformer 18 which is coupled to autocorrelator 14. (If a cross-correlator 16 is employed, the output of autocorrelator 14 is coupled to the cross-correlator, which is then coupled to Fourier transformer 18.) Fourier transformer 18 converts the time domain plots of the array of transducers into the frequency domain to yield spatial frequency data (U-V), which is used to synthesize the beam and side lobe response for noise deconvolution. The beam and side lobe response is determined by assigning a two-dimensional position to each transducer and executing a Fourier-like transformation of the array of delays to achieve a two-dimensional spatial frequency spectrum characterized so that each transducer pair corresponds to a (U-V) point. Each U-V point is assigned its corresponding transducer pair, and the representation of the U-V plane in the Fourier transformed frequency domain yields the data to be retransformed to produce the array point spread function or "dirty beam." The Fourier transformed frequency domain of the correlated data yields information which can then be Fourier inverted to yield a "dirty map." Such U-V data is stored in data storage means or matrix 22.

Further useful data is obtained by a data partitioning process for the visibility amplitude and visibility phase data as well as the corresponding U-V data.

As can be seen at the center of FIG. 1, visibility amplitude data may be stored in memory storage matrix 26a, the visibility phase data in matrix 26b, and "differential phase" data stored in matrix 26c. If a cross-correlator 16 is present in the system, "closure amplitude" data can be created and stored in matrix 26d and "closure phase" data can be created and stored in matrix 26e. U-V data indicating the beam and side lobe response for the visibility and closure amplitudes and phases and the differential phases are graphically shown as stored in the corresponding sub-matrices. The partitioned data can now be employed by mapper 27 to produce an echographic image. While the data in matrices 26a–26e is significantly increased, it still contains substantial noise, particularly in the phase data. Thus, it is highly advantageous to employ further noise reduction processing to enhance all data and particularly the noisy phase data. As shown in FIG. 1, the further signal processing of the method of the present invention takes the form of subtraction of the complex side lobe noise inherent in a synthesized aperture, preferably by using the CLEAN algorithm.

The next step in signal processing, therefore, is to generate a "dirty" map of the area of the synthesized aperture. The dirty map is defined as the Fourier inversion of the visibility amplitudes and phases, and if a cross-correlator is used, an inversion and modeling of the closure amplitudes and phases. The dirty map employs the frequency domain data in sub-matrices 26a–26e using mapping techniques well known in the art. Mapper 27 will be understood to include a Fourier inversion step, and the output of the mapper will be the original dirty map data, which can be stored in data storage matrix 29, and sent to identifier 36 and subtractor 34.

The dirty map produced will contain a high level of noise produced by side lobe responses inherent to the multi-transducer aperture array configuration. The side lobe subtraction process uses the U-V data in matrices 26a–26e to simulate a synthesized beam (a "dirty beam") response of the transducer array to a single point source. The dirty beam is the synthesized beam or point spread function of the array. Beam synthesizer 40 is responsible for converting or mapping the entire U-V data into a beam power pattern in the frequency domain. The beam power pattern which can be mapped from the U-V data in effect represents the side lobes which would inherently be generated if the target were a point structure or source seen or viewed by array 12 of transducers.

The side lobe subtraction or noise deconvolution process is an iterative process, which may be practically performed for real-time processing by using, but is not limited to use of, the CLEAN algorithm. It can be performed in either the time or frequency domain, but as illustrated in FIG. 1, side lobe subtraction is being performed in the time domain.

The first step is to identify the brightest point on the dirty map by scanning the data with identifier means 36. This identification is mathematically performed on the data by looking at the greatest peak or highest intensity value in the data. Since there are 262,144 data points in a typical ultrasonic display (512 lines of 512 pixels), such as display 42, scanning the entire map for the brightest point is computer burdensome. One technique which can be employed to reduce the computer burden is to scan only each line of 512 pixels in the X,Y or appropriately transformed image by identifier means 36 on a line-by-line basis for the brightest data point. If this technique is employed parallel processing by identifier 36 can be used, with the identifier being comprised of a plurality of parallel processors.

Once the brightest data point on the line (or map, if not done line-by-line) is identified, the CLEAN algorithm can be used to first deconvolve the point spread function (dirty beam) from the remaining data on the line. In the side lobe subtraction step the U-V beam response data in beam synthesizer 40 for a point source is subtracted from all the data in the line surrounding the brightest or highest peak on the line, as indicated by subtractor box 34 in FIG. 1. This step removes the data representing side lobes around the bright point on the line to yield a less noisy or "cleaner" map, with the data which represents the side lobe response around the bright data point being removed. Comparator 41 scans or compares the data in the resulting line against criteria as to the noise level which has been reduced. Resolution input device 43, for example, can specify the dynamic range of the map and lines therein, that is, the range of maximum signal to the noise level. The dynamic range can be required by input 43 to exceed a certain amount or else the noise deconvolution process will continue by going to the next brightest point on the line. Thus, if the criteria is not met, comparator 41 replaces the line data in mapper 27 with the cleaner data and identifier 36 identifies the second brightest point on the line so that subtractor 34 can remove the data representing the side lobe response from all of the other data on the line. This process continues until the data in the line yields an acceptable outcome.

One assumption which must be made when doing a line-by-line noise deconvolution is that the point spread function or dirty beam is two-dimensional, not three-dimensional. This assumption, however, is acceptable because the side lobes tend to be negligible in extending to the adjacent lines, particularly for the current commercially marketed probes. With improved transducer arrays side lobe data will begin to spill over or be found in significant quantities in adjacent lines, which will make line-by-line two-dimensional CLEAN subtractions less acceptable, i.e., side lobes in adjacent lines will be treated as being coupled or attached to data in the line which they appear, instead of a bright point in the adjacent line which actually caused the side lobe.

The problems introduced by the two-dimensional side lobe subtraction, when the point spread function is three-dimensional, can be greatly minimized by following the two-dimensional CLEAN with a second two-dimensional CLEAN, only with the data rotated by 90 degrees and the point spread function modified to be a central high peak and adjacent smaller side lobe peaks. Rotation of the data and deconvolution of the rotated side peaks allows the data representing side lobes in adjacent lines also to be removed.

As indicated above, however, data being captured by currently available ultrasonic apparatus will have a point spread function or beam pattern which is very close to two-dimensional, making line-by-line two-dimensional deconvolution using the CLEAN algorithm highly effective and a substantial reduction in computing burden.

During this iterative deconvolution process, a significant amount of noise data will be removed from the original data set which came from mapper 27 and now is stored in data storage means 29. The side lobe subtraction iteration, however, also will introduce into the processed data set data points and values which do not represent actual structure in the object being imaged, i.e., processing artifacts. Accordingly once comparator 41 senses that the dynamic range of the data meets the criteria input, the data is passed to masking means or "masker" 45 as a "processed data set."

The apparatus and process of the present invention provide an accurate and yet simple system for removing the processing noise component from the processed data set. Masking means 45 accomplishes this end by multiplying the values of data (the pixel intensity values) in the processed data set (map) by the values of corresponding data (pixel intensity values) in the original data set (map). Thus, each pixel intensity value in the processed map is multiplied by the corresponding pixel intensity value in the dirty map. The processed data set from comparator 41, which is passed to masking means 45, is multiplied times corresponding data from the dirty map in storage means 29 on a pixel by pixel basis. This revaluing or masking of data is a form of what is sometimes referred to as "self-apodization."

Original or "dirty" map data as stored in storage means 29 includes all of the valid data from the original data set to accurately reproduce the image. The data in storage means 29 also includes a substantial amount of noise data which does not represent valid target structure. The data which is passed from comparator 41 to masking device 45 has eliminated a substantial amount of the noise which is present in the data in storage device 29, but it also has introduced a much smaller quantity of processing noise or artifacts. The effect of multiplying corresponding data values for the dirty map times the noise-reduced map is that data which is present in both data sets will be reinforced in the data sent to normalizer 39, while the processing noise component data which was introduced after the dirty map was generated will have no corresponding reinforcement by the dirty data in storage device 29. The dirty data in storage device 29, therefore, has the effect of masking out or removing the processing noise component of the data in the processed data set.

If the original image data set includes zero pixel value, intensity multiplying processed image data by zero will have the effect of discarding data in the processed image data set which was not also present in the original image data set. For low value data in the original image data set, the low value of such data when multiplied times the corresponding processed image data will reduce the value of artifacts which are coincidentally present.

It will be appreciated that it is statistically possible for the processing noise component of the processed data set to have some artifacts which are coincidental with noise in the original dirty data set. Thus, the masking process of the present invention may not eliminate all of the processing noise component in the processed data set, but it will effect a substantial reduction in such noise component and statistically can also effect complete elimination of the processing noise component in certain instances.

In more complex imaging processing systems, and particularly those not requiring real-time display, it would even be possible to employ double masking. For example, the data can be processed using side lobe subtraction followed by masking to reduce the processing noise component. The same data can then be processed using hybrid mapping or maximum entropy and masked to reduce the processing noise component. These two sets of data can then be masked against each other so that only the data points which are common to both data sets are reinforced and the non-common ones are masked out. This will further reduce the noise by reducing statistically coincident processing noise components because the two differing signal processing techniques will produce differing artifacts that will have differing statistical coincidences with data in the original or dirty data set.

The preferred technique for multiplying the values in the processed data set by the values in the original data set is to multiply the value of data in the processed image data set by the absolute value of corresponding data in the original image data set and then to divide that result by the highest data value of any data in the original image data set. This division step has a scaling effect so that data values do not exceed a maximum.

The reduction of noise from processed image data of the present invention is particularly useful for noise reduction processes such as side lobe subtraction using a CLEAN algorithm, maximum entropy noise reduction and hybrid mapping noise reduction. It can be used when the data is captured by radar imaging apparatus, sonar imaging apparatus, microwave imaging apparatus, ultrasonic imaging apparatus, optical imaging apparatus and radio astronomy imaging apparatus, as long as the captured image data has been processed by an image processing technique which introduces a processing noise component. Since revaluing the data to eliminate or reduce the processing image component is merely a multiplication, usually in combination with a division for scaling, the process of the present invention is not computer burdensome nor does it prevent real-time processing.

Before data masking has been effected, the data is passed to convolver or convolving means 46. The CLEAN algorithm is preferably again used on a line-by-line basis to convolve a two-dimensional side lobe-free point spread function or "clean beam" back into the deconvolved and noise-reduced data prior to masking of the data.

One technique which can be used to further enhance the resolution of the displayed image is to use the CLEAN algorithm to control the restoring or clean beam to a width substantially smaller than that of the main lobe on the dirty beam. This is an "over-processing" of the data, but it is very acceptable and achieves super-resolution in ultrasonic applications. Thus, the CLEAN algorithm can be used to narrow the side lobe-free point spread function as it is convolved by convolver 46 back into the data to masking device 45. When you narrow the restoring or clean beam you increase the effective diameter of the aperture. It will be appreciated, however, that as the restoring beam is narrowed, you begin to "eat away" or create holes in the data, i.e., overprocessing. Nevertheless resolution of the images increases and such overprocessing can proceed, for example, past the Rayleigh's criteria, which is referred to as "superresolution."

One effect of the masking process of the present invention is that the contrast can be increased as a result of pixel intensity revaluation to a degree which arguably can hide real target features. It is a further important feature of the present invention that normalizing be provided to normalize the intensity or prevent undesirable contrast changes.

This normalization can be effected at normalizer 39 by applying the $n^{th}$ power to the data values, rather than forming a display image from the values after the masking revaluation step. If the brightest point on the data map or line has a value of 1.0, the $n^{th}$ power of that value also is equal to 1.0. The powers preferred are between about 0.2 and 1.0. Thus, the square root ($n=0.5$) of a data point having a value of 0.49 is 0.7, which effectively causes the intensities to converge toward the brightest point and the contrast differences to be reduced.

As will be appreciated if one wanted to increase the contrast for any reason, a converse process could be employed, namely, use and display masked data taken to a power greater than 1.0, e.g., n=2. Again, a data value of 1.0 would remain unchanged while a value of 0.5 would decrease to 0.25.

It should be noted in this regard that most ultrasonic display devices 42 are capable of generating pixels commonly having 64 or 256 intensity gradations, with zero being black and 64 or 256 being the highest intensity. The values after masking will range from zero to 1.0 and they are accordingly attributed to the range of intensity levels available on the video display.

In a second aspect of the process and apparatus of the present invention correction for phase aberration or near field effects is provided. As above noted the provision of a cross-correlator 16 and partition of the data to include closure amplitude and closure phase data (storage means 26d and 26e) will completely eliminate the problem of phase aberration caused by transmission and/or receipt of signals through inhomogeneous mediums. Unfortunately, commercially available ultrasonic imaging apparatus does not include cross-correlation apparatus. It is a purpose of the present invention, therefore, to effect a reduction in the phase aberration in image processing equipment which does not include or use cross-correlation to eliminate phase aberration.

Figures 2A, 2B, 2C, 2D:
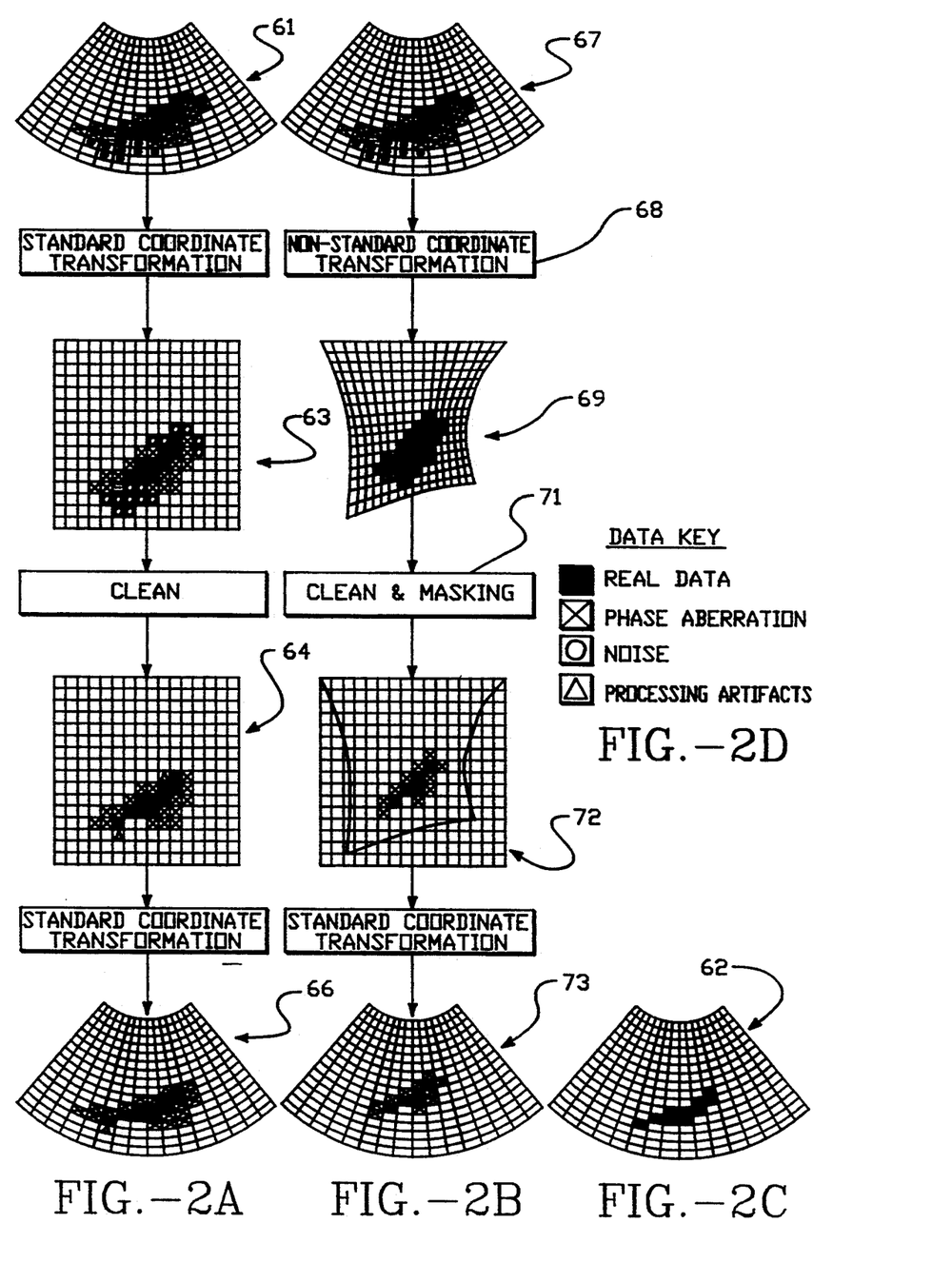
FIG. 2A is a graphical representation of a plot of image data as it would appear in memory at various stages of signal processing using the method of my prior application.
FIG. 2B is a graphical representation of a plot of the same image data as FIG. 2A using the signal processing method of the present application.
FIG. 2C is a graphical representation of the same image data as FIG. 2A as it should appear in memory at the stage immediately before display.
FIG. 2D is a "Data Key" for the symbols used in FIGS. 2A–2C.

Referring now to FIG. 2A and 2D, a graphical representation of a hypothetical image data set is shown as it would be seen if displayed from memory at various stages of processing using the signal processing method of my prior application. Thus, graphical representation 61 shows the image data in polar coordinates, r,θ. Medical personnel are used to viewing ultrasonic image data in a polar format, rather than a Cartesian format. Video display tubes are physically constructed with Cartesian screens, that is lines and rows of pixels, but the image on graph 61 would have the same shape as shown on a video display 42, except that the pixel grid would be Cartesian.

In polar data graph 61 there will be seen to be a plurality of solid grid "squares" that represent actual or real image data. This is the data that imaging personnel want to see, and it is shown again in FIG. 2C as graph 62. In polar graph 61, however, there is phase aberration data, shown by squares with an "X" inside them, and there is noise data, shown by squares with a "O" inside them. If graph 61 was to be displayed without processing, a very cloudy image would be seen in which it would be difficult to determine the real shape of the target, namely, graph 62.

Accordingly, to facilitate side lobe subtraction using the CLEAN algorithm, or other signal processing techniques, the r,θ data captured by the transducer array is usually converted into Cartesian or X,Y data, as shown at screen 63 in FIG. 2A. As will be seen by comparison of graphical representations 61 and 63, all the data is still present in graph 63 that was present in graph 61.

While it is conventional to perform the CLEAN deconvolution in a Cartesian coordinates, rather than polar coordinates, it should be noted that it also is possible to use a coordinate transformation of the point spread function or beam and then perform the CLEAN in r,θ or polar coordinates. In either approach, however, a transformation between coordinate systems must be undertaken.

The coordinate transformation so as to produce exactly equivalent Cartesian coordinates from polar coordinates, or vice versa, is covered by simple algorithm, namely:

$$r = \sqrt{(X - K_x)^2 + (Y + K_y)^2}$$

$$\theta = \arctan\left(\frac{X - K_x}{Y + K_y}\right)$$

where $K_x$ and $K_y$ are constants dependent upon the distances from r=0 and θ=0 to X=0 and Y=0.

If the conventional above set forth coordinate transfer is used, the phase aberration data in the image data set, caused by transmission of the signal and its reflection through an inhomogeneous medium will simply be passed through to graph 61, as will all noise data.

The next step in data processing is to remove the side lobes, for example, by use of the CLEAN algorithm. As will be seen from graph 64, therefore, the noise data has been removed using the CLEAN algorithm in Cartesian coordinates. As also can be seen in graph 64, the CLEAN signal processing step has introduced a few processing artifacts, the data represented by a triangle inside the data squares.

The X,Y or Cartesian data after the CLEAN step can then be converted back to r,θ, or polar, coordinates for display. Thus, graph 66 illustrates the image which would be displayed after signal processing using the process of my prior application without cross-correlation, and it can be seen to include phase-aberration or near-field effect data. It should be noted again that the same data image as shown on graph 66 would be displayed on a Cartesian screen so that the video screen 42 would have an X,Y grid, but the image would have the appearance of screen 66, not screen 64.

In the process and apparatus of the present invention, however, a coordinate transformation input device 55 (FIG. 1) can be used to input the data processor or computer 17 with non-standard coordinate transfer algorithms. (As will be appreciated input device 55 and input device 43 can be provided by a convention computer input device such as a key board.) Such non-standard coordinate transfer algorithms have the effect of distorting the data and resultant image. Such distortion can be used to counter or compensate for the effect of phase aberration by reason of passage of the signals through an inhomogeneous medium.

Coordinate transformation input device 55, therefore, can be used to vary the coordinate transformation algorithms in a manner which is empirically determined for standard medical applications to correct for phase aberration which typically occurs in such applications. In transabdominal ultrasonic imaging, for example, one will experience a different amount and type of phase aberration than occurs in transvaginal applications. Input device 55 can be used to vary the coordinate transformation algorithms while viewing the resulting image. A table can be established, therefore, as to which variations produce greater resolution and which variations produce image blurring. Ultimately, such a comparison system can be done computationally in computer 17 with means being provided to compare image resolution against an input criteria and to automatically vary the coordinate transformation algorithms until the highest degree of resolution is achieved.

In FIG. 2B, graph 67 is identical to graph 61 and contains real image data, phase aberration data and noise data. At the step represented by box 68, a non-standard coordinate transformation takes place through input from input device 55. As will be seen, the data of graph 67 has been transformed to data on a distorted "Cartesian" grid 69, with the result that the area occupied by the data has been changed. Again, all the data are present in graph 69, but it has been compressed and skewed as a result of the non-standard coordinate transformation.

Graph 69 illustrates a two dimensional proportional non-standard coordinate transformation. It will be understood, however, that non-standard coordinate transformations can be one or two-dimensional and can be localized.

At step 71 the data in graph 69 has been subject to a CLEAN side lobe subtraction, which eliminates the noise data, and has been masked, which eliminates the processing artifacts. The result is shown on graph 72 in which the data is shown on a standard Cartesian coordinate grid, but it has been distorted in shape to the shape of the data in grid 69, less the noise data, eliminated by the CLEAN, and without any artifact data, eliminated by the masking. The number of "data points" appears to be less in graph 72 than in graph 69 by reason of plotting on the undistorted Cartesian graph, but the shape and area of the real data and phase aberration data are substantially the same (changed only by the size of the grid and large size of the squares which require a graphical approximation). Finally, the CLEANed and masked data is returned to polar coordinates in graph 73 in a standard coordinate transformation preparatory to display on video output device 42. As will be seen by comparing graphs 62, 66 and 73, the image which would be displayed from the data in graph 73 is much closer to the ideal image of graph 62 than is the image of graph 66. The graph 73 image has not eliminated the phase-aberration data, but instead it has been distorted in a manner compensating for the distortion produced by the inhomogeneous medium.

This phase aberration approximation is not an exact solution to phase aberration, as is cross-correlation, but it does provide a system in which medical personnel can try various coordinate transformations as a way of clearing or reducing phase aberration. Since the computational burden is not great, such empirical adjustment, particularly with the aid of tables, can be accomplished by the physician or technician during real-time imaging. The technique of the present invention is somewhat analogous to dropping different lenses in front of the transducer array to reduce phase aberration without cross-correlation.

What is claimed is:

1. A method of producing an image of an object having a reduced noise component comprising the steps of:
   positioning imaging transducer device for receipt of a sufficient number of image signals from said object to permit an image of said object to be produced;
   transforming said image signals into an original data set;
   processing said original data set, while storing the values of said original data set in a storage device, by a noise deconvolving process producing a processed data set in which said noise component is reduced as compared to said original data set in said storage device and a processing noise component has been introduced into said processed data set;
   thereafter reducing said processing noise component in said processed data set by multiplying the value of individual data in said processed data set by the value of corresponding individual data in said original data set as stored in said storage device; and
   thereafter displaying data resulting from said reducing step as an echographic image.

2. A method of clinically analyzing a physical condition comprising the steps of:
   transmitting ultrasonic signals from transducer means into a patient's tissues;
   receiving echo signals by transducer means from said tissues to provide an original image data set of signals of said tissues;
   processing said original image data set of signals to produce a processed image data set of signals having reduced noise components and artifact data;
   revaluing at least some of the data in said processed image data set of signals by an amount proportional to the value of corresponding data in said original image data set of signals;
   after said revaluing step, displaying the data in said processed image data set as a noise-reduced image; and
   thereafter using the image created during said displaying step to clinically analyze said tissues.

3. The method as defined in claim 2 wherein,
   said revaluing step is accomplished by valuing as zero all non-zero value data in said processed image data set for which corresponding data in said original image data set has a zero value.

4. The method as defined in claim 2 wherein,
   said revaluing data step is accomplished by discarding all data in said processed image data set not also present in said original image data set.

5. The method as defined in claim 2 wherein,
   said revaluing step is accomplished by multiplying the value of data in the processed image data set by the value of corresponding data in said original image data set.

6. The method as defined in claim 2 wherein,
   said revaluing step is accomplished by multiplying the value of data in said processed image data set by the absolute value of said corresponding data in said original image data set and dividing the product by the highest data value of any data in said original image data set.

7. The method as defined in claim 6, and the step of:
   after said revaluing step, normalizing the value of said data in said processed image data set by raising the value of said data in said processed image data set to the power n, where n is between about 0.2 to about 1.0.

8. The method as defined in claim 2 and the step of:
   producing said processed image data set by deconvolving the original noise component from said original image data set and eliminating at least a portion of said noise component.

9. A method of enhancing the dynamic range of an image produced from data in an original image data set comprising the steps of:
   positioning an imaging transducer for receipt of a sufficient number of image signals from an object to be imaged to provide said original image data set;
   processing said original image data set by a signal processing technique producing a processed image data set including image data having an enhanced dynamic range relative to said original image data set and including artifact image data produced by said processing technique; and reducing the quantity of artifact image data in said processed image data set to further enhance dynamic range by multiplying the value of at least a portion of the data in said processed image data set by the value of corresponding date in said original image data set.

10. The method as defined in claim 9 wherein,
said step of processing is accomplished by processing an original image data set obtained from echographic imaging apparatus.

11. The method as defined in claim 10 wherein,
said echographic imaging apparatus is an ultrasonic imaging apparatus.

12. The method as defined in claim 10 wherein,
said echographic imaging apparatus is a radar imaging apparatus.

13. The method as defined in claim 10 wherein,
said echographic imaging apparatus is a sonar imaging apparatus.

14. The method as defined in claim 10 wherein,
said echographic imaging apparatus is a microwave imaging apparatus.

15. The method as defined in claim 9 wherein,
said step of processing is accomplished by processing an original image data set obtained from radio astronomy imaging apparatus.

16. An imaging apparatus comprising:
an array having a plurality signal receiving transducers formed for receipt of a sufficient number of image signals from an object to be imaged to enable creation of an image display therefrom;
processing means coupled to said array and responsive to receipt of said imaging signals to transform said imaging signals into an original data set containing a noise component resulting from use of said array to receive said image signals, said processing means processing said original data set to produce a processed data set having a reduced original noise component and a processing noise component;
data valuation means coupled to said processing means and responsive to production of a processed data set to revalue data in said processed data set by multiplying the value of data in said processed data set with the value of data in said original data set to reduce said processing noise component from said processed data set; and
display means connected to display data multiplied by said data valuation means as an image of said object.

17. The data processing apparatus as defined in claim 16 wherein,
said data acquisition means is an image data acquisition means.

18. The data processing apparatus as defined in claim 17 wherein,
said image data acquisition means is an echographic imaging apparatus.

19. The data processing apparatus as defined in claim 18 wherein,
said echographic imaging apparatus is an ultrasonic imaging apparatus.

20. The data processing apparatus as defined in claim 18 wherein,
said echographic imaging apparatus is a radar imaging apparatus.

21. The data processing apparatus as defined in claim 18 wherein,
said echographic imaging apparatus is a sonar imaging apparatus.

22. The data processing apparatus as defined in claim 18 wherein,
said echographic imaging apparatus is a microwave imaging apparatus.

23. The data processing apparatus as defined in claim 17 wherein,
said image data acquisition means is a radio astronomy imaging apparatus.

24. An echographic imaging apparatus comprising:
transducer means formed to produce transmitted signals which can be directed against an imaging target and formed to receive echo signals including a noise component from said target;
first signal processing means coupled to said transducer means to transform said transmitted signals and said echo signals into an original image data set having an original noise component;
second signal processing means coupled to said first signal processing means and response to production of said original image data set to produce a processed image data set in which said original noise component is reduced and a processing noise component has been introduced;
data valuation means coupled to said second image processing means and responsive to production of said processed signal data set to multiply the value of data in the processed image data set by the value of corresponding data in the original image data set to reduce said processing noise component in said processed image data set; and
display means connected to receive data multiplied by said data valuation means and formed to display the multiplied data as an echographic image.

25. A method of clinically analyzing a physical condition comprising the steps of: transmitting ultrasonic signals from a transducer device into a patient's tissues;
receiving echo signals by transducer device from said tissues to provide an original image data set of signals of said tissues;
processing said original image data set of signals by at least one of a CLEAN deconvolution process, a maximum entropy deconvolution process and a hybrid mapping deconvolution process to produce a processed image data set of signals having reduced noise components and artifact data;
revaluing at least some of the data in said processed image data set of signals by an amount proportional to the value of corresponding data in said original image data set of signals;
after said revaluing step, displaying the data in said processed image data set as a noise-reduced image; and
thereafter using the image created during said displaying step to clinically analyze said tissues.

26. The method as defined in claim 25 and the step of:
after said revaluing step, raising each data value in said processed image data step to a power between about 0.2 and about 1.0.

27. An echographic imaging apparatus comprising:
transducer device formed to produce transmitted signals which can be directed against an imaging target and formed to receive echo signals including a noise component;

a first signal processing assembly coupled to said transducer device to transform said transmitted signals and said echo signals into an original image data set having an original noise component;

a second signal processing assembly coupled to said first signal processing assembly and responsive to production of said original image data set to produce a processed image data set in which said original noise component is reduced and a processing noise component has been introduced;

data valuation assembly coupled to said second image processing assembly and responsive to production of said processed signal data set to multiply the value of data in the processed image data set by the value of corresponding data in the original image data set to produce a plurality of data products and to divide each of said plurality of data products by the highest value of any data in said original data set to reduce said processing noise component in said processed image data set; and display device connected to receive data multiplied by said data valuation assembly and formed to display the multiplied data as an echographic image.

28. The apparatus as defined in claim 27 wherein, said data valuation means includes normalization means responsive to input of revolved data to raise the value of said revolved data to a power between about 0.2 to about 1.0.

29. The apparatus as defined in claim 27 wherein, said transducer means produces ultrasonic signals.

30. The apparatus as defined in claim 27 wherein, said transducer means produces radar signals.

31. The apparatus as defined in claim 27 wherein, said transducer means produces sonar signals.

32. The apparatus as defined in claim 27 wherein, said transducer means produces electromagnetic signals.

33. A method of generating an echographic image of a target object comprising the steps of:
(a) transmitting a plurality of ultrasonic signals toward said target object using a signal generating assembly;
(b) receiving a corresponding plurality of echo signals from said target object with signal receiving transducer means;
(c) in response to receipt of said echo signals correlating said ultrasonic signals and said echo signals using correlation means to produce correlated data including at least one of amplitude data and phase data sufficient to map an image of said target object; and
(d) reducing noise present in said correlated data by signal processing means by at least one of: (i) a side lobe subtraction process, (ii) a hybrid mapping process, (iii) a vectorial summing process, (iv) a ratio forming process, and
(e) mapping at least one of said amplitude data and said phase data after said step of reducing noise.

34. The method of generating an echographic image of a target object as defined in claim 33, and prior to said noise reducing step, partitioning said correlated data by partitioning means into a plurality of data sets including at least one of a visibility amplitude data set and a visibility phase data set.

35. An apparatus for generating an echographic image comprising:
a plurality of ultrasonic transducers mounted in an array,
generator means coupled to drive said transducers,
signal processing means coupled to said transducers to receive echo signal data therefrom and coupled to receive transmitted ultrasonic signal data, said signal processing means correlating and mapping at least one of amplitude data and phase data from said ultrasonic signal data and said echo signal data, said signal processing means including means for processing at least one of amplitude data and phase data including means for reducing noise in at least one of said amplitude data and said phase data, said means for reducing noise being provided by one of:
(i) means for subtracting side lobe noise from said one of said amplitude data and said phase data, and
(ii) means for substituting hybrid map data for one of actual phase data and actual amplitude data, and said signal processing means further including mapping means for mapping at least one of said amplitude data and said phase data after the reduction of noise therefrom; and display means coupled to said signal processing means to receive mapped data from said signal processing means and to display said mapped data in an image.

36. An apparatus for generating an echographic image comprising:
a plurality of ultrasonic transducers mounted in an array;
signal generator means coupled to drive said transducers;
signal processing means coupled to receive echo signals from said transducers and coupled to receive echo signals, said signal processing means being responsive to correlate said echo signals relative to said transmitted signals to produce at least one of phase signals and amplitude signals suitable for image mapping, said signal processing means further including noise reduction means responsive to at least one of said phase signals and said amplitude signals to reduce noise in said one of said phase signals and said amplitude signals;
said noise reduction means including at least one of:
(i) means for subtracting said lobe noise from at least one of said amplitude signals and said phase signals, (ii) means for substituting hybrid map signals for at least one of said amplitude signals and said phase signals, (iii) means for vectorially summing sets of three phase signals to produce closure phase signals, and (iv) means for forming ratios of sets of four amplitude signals to produce closure amplitude signals; and
display means coupled to said signal processing means to receive at least one of said phase signals and said amplitude signals after noise reduction by said noise reduction means and responsive thereto to produce an image.

* * * * *

UNITED STATES PATENT AND TRADEMARK OFFICE
CERTIFICATE OF CORRECTION

PATENT NO. : 5,383,457

DATED : January 24, 1995

INVENTOR(S) : Nathan Cohen

It is certified that error appears in the above-identified patent and that said Letters Patent is hereby corrected as shown below:

Column 2, line 66, delete "application" and insert therefor --applications--;

Column 3, line 9, after "but" delete "is" and insert --it---; and

Column 17, claim 9, line 8, after "corresponding" delete "date" and insert --data--.

Signed and Sealed this

Ninth Day of May, 1995

Attest:

BRUCE LEHMAN

*Attesting Officer*     *Commissioner of Patents and Trademarks*